UNITED STATES PATENT OFFICE.

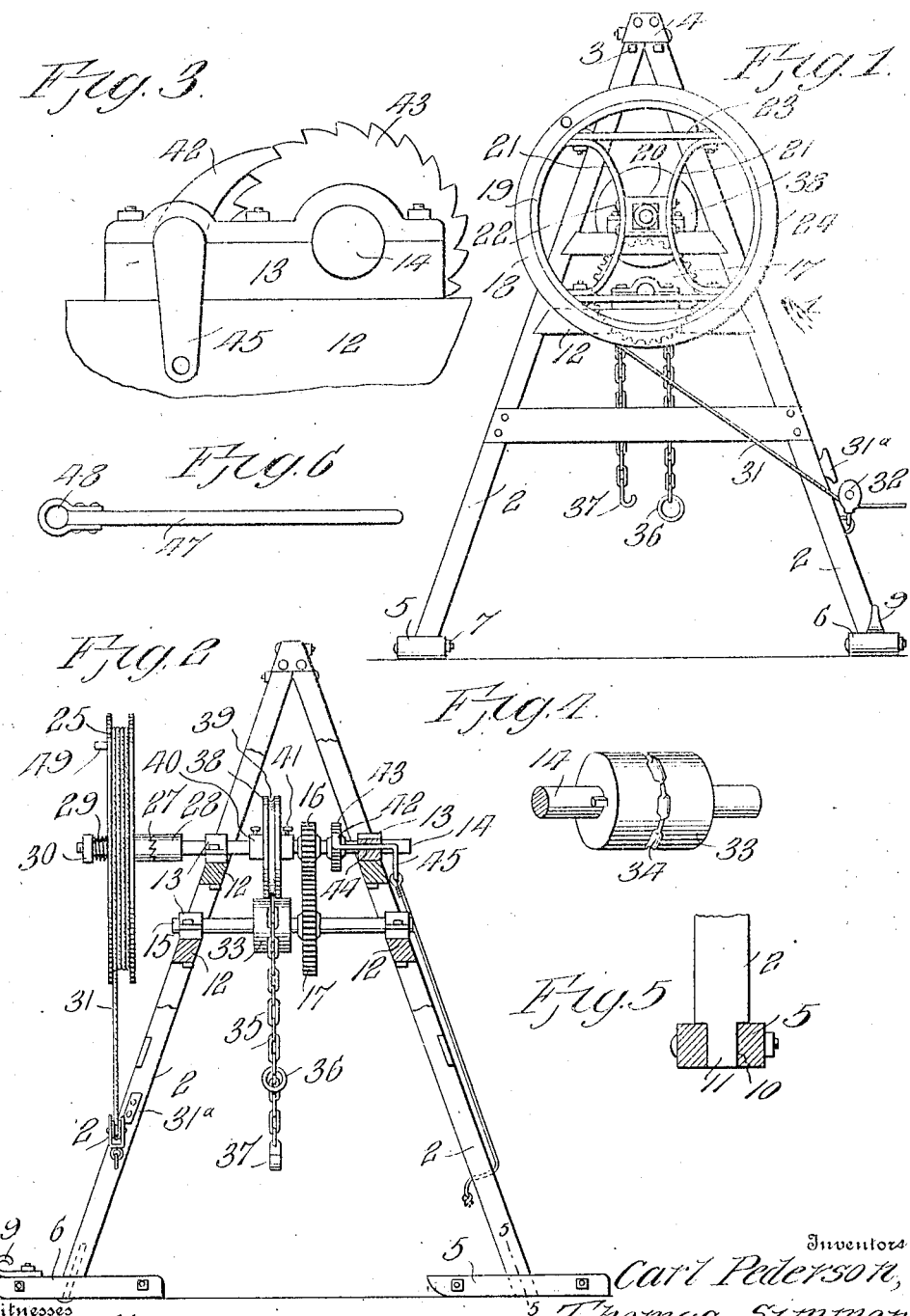

CARL PEDERSON AND THOMAS SIMMONS, OF MENOMONIE, WISCONSIN.

STUMP-PULLER.

No. 916,191.  Specification of Letters Patent.  Patented March 23, 1909.

Application filed June 5, 1908. Serial No. 436,916.

*To all whom it may concern:*

Be it known that we, CARL PEDERSON and THOMAS SIMMONS, citizens of the United States of America, residing at Menomonie, in the county of Dunn and State of Wisconsin, have invented new and useful Improvements in Stump-Pullers, of which the following is a specification.

Our invention relates to stump pullers, and its primary object is the provision of a device of this character which shall be simple, durable and efficient, which shall comprise comparatively few parts, and which shall be capable of being manufactured and sold at a comparatively low cost.

With the above and other objects in view, the invention consists in the construction, combination and arrangement of parts hereinafter fully described and claimed and illustrated in the accompanying drawings, wherein:

Figure 1 is a view in front elevation of a stump puller constructed in accordance with our invention. Fig. 2 is a sectional view thereof taken on a plane extending centrally and vertically therethrough. Fig. 3 is a view in side elevation of the means by which the shaft is held against backward movement. Fig. 4 is a perspective view of the chain pulley. Fig. 5 is a sectional view on the line 5—5 of Fig. 2, and Fig. 6 is a view in elevation of the lever by means of which the power wheel can be rotated to rewind the operating cable.

Referring to the drawing by reference numerals, 1 designates the frame of our improved stump puller. The frame comprises a circular series of standards 2 which are inclined upon each other. The upper ends of the standards 2 are secured together by means of a plurality of bolts 3, and said ends are inclosed by means of a metallic cap 4 which adds strength and stability to the frame and which protects the upper ends of the standards 2 from the elements. The frame is supported by means of runners 5 and 6 which are preferably constructed of wood and which are prevented from splitting by means of bolts 7 passing transversely therethrough. The runner 6 is pivotally secured to one of the standards 2 by means of a member 8 and is provided with a clevis 9, said clevis permitting a draft animal to be secured to the stump puller. The runners 5 are provided with sockets 10 which receive the reduced lower ends 11 of the standards 2. The connections between the runners 5 and 6 and the standards 2 are such that they will readily assume proper relative positions during the moving of the machine from one place to another.

Superposed pairs of bars 12 are secured in parallel alinement to the standards 2. Bearings 13 are secured to the upper surfaces of the bars 12 for the reception of a power shaft 14 and an extractor shaft 15. A pinion 16 is fixed on the power shaft 14 and meshes with a larger pinion 17 fixed on the extractor shaft 15. The power shaft 14 is adapted to be driven through the medium of a power wheel 18. The power wheel comprises an annular periphery 19, a hub 20 and curved spokes 21. The spokes 21 are secured at their ends to the periphery 19 in a manner to dispose their convex surfaces in opposition and relatively spaced. The hub 20 is secured between and to the spokes 21 by means of bolts 22 which pass through the spokes and the hub. The power wheel also comprises braces 23 which are secured at their ends to the spokes 21, and annular members 24 which are secured to the periphery 19 to provide the wheel with a cable receiving groove 25. The hub is provided with an opening 26 to receive one end of the power shaft 14 which projects beyond the frame, and is provided with one member 27 of a clutch, the other member 28 of the clutch being fixed on the power shaft. The members of the clutch are resiliently held in operative relation by means of an expansible coiled spring 29 which is interposed between the power wheel 18 and a nut 30 mounted on the threaded end of the power shaft 14. The connection between the power wheel and power shaft is such that when the power wheel is revolved in one direction, the shaft will be rotated, and that when the power wheel is revolved in the reverse direction, the shaft will not be rotated.

It will be seen that one phase of the rotation of the power wheel is operative, while the other phase thereof is inoperative. The power wheel is adapted to be revolved through the medium of an operating cable 31 which is secured at one end to the power wheel and wound one or more times about the same, the wound lengths of operating cable being disposed in the groove of the power wheel. The operating cable leaves the power wheel preferably at a point below the center thereof and passes through a pulley 32 swiveled upon one of the standards 2 of the frame. A chain pulley 33 is fixed upon the extractor shaft 15 and has its periphery formed to provide recesses 34, said recesses being designed to receive one or more links of a chain 35 which passes about the pulley. One end of the chain is provided with a ring 36 and the other end thereof is provided with a hook 37. The links of the chain 35 which engage in the recesses 34 of the pulley 33 are held in such recesses by means of a wheel 38, which is loosely mounted upon the power shaft 14 for contact with the chain pulley, said wheel being provided in its periphery with an annular groove 39 adapted to receive those portions of the links which project above the pulley. The wheel is secured in applied position by collars 40 which are mounted on the power shaft 14 and which are in turn secured in applied position by means of set screws 41. The connection between the chain 35 and pulley 33 is such that when the extractor shaft 15 is rotated, the chain is passed over the pulley in a direction to elevate or lower one end thereof.

In practice, a chain, not shown, is suitably passed about the stump to be pulled, and such chain is connected to the ring 36 of the chain 35. After the stump has been secured to the chain 35 power is applied to the operating cable 31. The application of power to the cable revolves the power wheel in a direction to operate the power shaft 14. The rotation of the power shaft 14 is transferred to the extractor shaft 15 through the medium of the pinions 16 and 17. As the pinion 17 is larger than the pinion 16, it should be apparent that the extractor shaft is driven at a speed much less than the speed of the shaft 14. The rotation of the shaft 15 elevates the stump, and said shaft is held against accidental backward rotation by means of a dog 42 which is pivotally mounted upon one of the bearings 13 for engagement with a ratchet wheel 43 keyed upon the power shaft 14. The bearing 13 is formed to provide a bearing 42 for the reception of the journal 44 of the dog 42. The dog 42 is provided with a crank arm 45, the gravity of which yieldingly holds the dog in position for successive engagement with the teeth of the ratchet wheel 43. The dog 42 may be thrown out of engagement with the ratchet wheel 43 to permit the extractor shaft 15 to have backward movement by means of a pull cord 46 which is secured at one end to the crank arm 45. After the stump has been extracted from the ground, the machine is moved to the point where it is desired to deposit the stump, and the dog 42 thrown out of engagement with the ratchet wheel, whereupon the weight of the stump will cause it to gravitate to the ground. The movement of the stump can be controlled by passing a hitch in the operating cable about the snubber 31ª secured to one of the standards 2 of the frame. As only one phase of the rotation of the power wheel is operative, said wheel may be independently rotated to wind the operating cable about the same, and said wheel is adapted to be rotated for this purpose through the medium of a bar 47 which is provided at one end with a loop 48 adapted to receive a crank pin 49 secured to one of the spokes 21 of the power wheel.

It should be apparent from the above description taken in connection with the accompanying drawing, that we provide a machine which is admirably adapted for the purpose for which it is intended, which is simple, durable and efficient, and which may be manufactured and sold at a comparatively low cost. In view of the manner in which the power wheel is mounted on the power shaft, and in view of the provision of the dog 42, it should be apparent that the operation of the stump puller is of a comparatively less laborious and dangerous nature.

Changes in the form, proportions and minor details of construction may be made within the scope of the claims without departing from the spirit or sacrificing any of the advantages of the invention.

Having fully described and illustrated our invention, what we claim is:

1. A stump puller comprising a frame, a power shaft journaled on the frame, a power wheel mounted upon the shaft, an extractor shaft journaled on the frame, connection between the shafts, a chain pulley fixed on the extractor shaft, and a guide pulley mounted on the power shaft.

2. A stump puller comprising a frame, a power shaft journaled on the frame, a power wheel mounted upon the power shaft, a clutch adapted to connect the power wheel with the power shaft, an extractor shaft journaled on the frame, connection between the shafts, a chain pulley fixed upon the extractor shaft, a guide pulley mounted upon the power shaft, a ratchet wheel fixed on the power shaft, and a dog mounted upon the frame for engagement with the power wheel.

3. A stump puller comprising a frame, an extractor shaft journaled on the frame, a power shaft journaled on the frame, connection between the shafts, a power wheel, mounted upon the power shaft, only one phase of said wheel being operative to rotate the power shaft, a crank pin secured to the power wheel, and a power cable secured to the power wheel.

4. A stump puller comprising a frame, an extractor shaft journaled on the frame, a chain pulley fixed upon the extractor shaft, a power shaft journaled on the frame, connection between the shafts, a guide pulley mounted upon the power shaft, a ratchet wheel fixed upon the power shaft, a dog pivotally mounted upon the frame for engagement with the ratchet wheel, a clutch member fixed upon the power shaft, a power wheel mounted upon the power shaft, a
5 clutch member fixed upon the power wheel, and a spring mounted upon the power shaft and yieldingly holding the clutch members in operative relation.

In testimony whereof we affix our signatures in presence of two witnesses.

CARL PEDERSON.
   THOMAS SIMMONS.

Witnesses:
 Lou Burkhardt,
 F. W. Rowe.